(12) United States Patent
Rocca et al.

(10) Patent No.: US 8,028,811 B2
(45) Date of Patent: Oct. 4, 2011

(54) PROCESS FOR RELEASE OF AT LEAST ONE PRESSURE MEDIUM OPERATED SPRING ACCUMULATOR BRAKE AND AN APPARATUS AND HYDRAULIC CIRCUIT FOR CARRYING OUT THE PROCESS

(75) Inventors: Wolfgang Rocca, Stutensee (DE); Hermann Christ, Bubach (DE)

(73) Assignee: FSP Fluid Systems Partners Holding AG, Baar (CH)

( * ) Notice: Subject to any disclaimer, the term of this patent is extended or adjusted under 35 U.S.C. 154(b) by 163 days.

(21) Appl. No.: 12/006,686

(22) Filed: Jan. 5, 2008

(65) Prior Publication Data

US 2008/0142316 A1      Jun. 19, 2008

(30) Foreign Application Priority Data

Jul. 8, 2005    (EP) .................................... 05106281

(51) Int. Cl.
*F16D 65/24*    (2006.01)
(52) U.S. Cl. ....................... 188/151 A; 188/170; 303/15
(58) Field of Classification Search ................ 303/3, 15, 303/71, 89; 60/386, 402, 494; 91/447, 445
See application file for complete search history.

(56) References Cited

U.S. PATENT DOCUMENTS 5,984,425 A * 11/1999 Orzal ................................. 303/3
6,675,576 B2 * 1/2004 Bigo et al. ...................... 60/436
6,715,590 B2 * 4/2004 Tabor ............................ 188/170

* cited by examiner

*Primary Examiner* — Bradley King
*Assistant Examiner* — Thomas Irvin
(74) *Attorney, Agent, or Firm* — CUSPA Technology Law Associates; Yi Li

(57) ABSTRACT

The invention relates to a process for releasing at least one spring accumulator brake (10), which is operated by a pressure medium and which is connected to a brake-release-pressure-supply-circuit (63) in normal operation for impact with a brake release pressure and which, in service operation, is detached from the circuit (63) in case of failure of the brake release pressure and is released through a pressure medium source (37) against the spring force of the spring accumulator. To develop the process in such a way that the risk of an accident taking place reduces after the brake release pressure has failed, it has been proposed in the invention that at least one brake (10) gets re-connected automatically with the circuit (63) when the brake release pressure is provided again. Further, an apparatus and a hydraulic circuit for carrying out the process are proposed.

19 Claims, 2 Drawing Sheets

Figure 1:
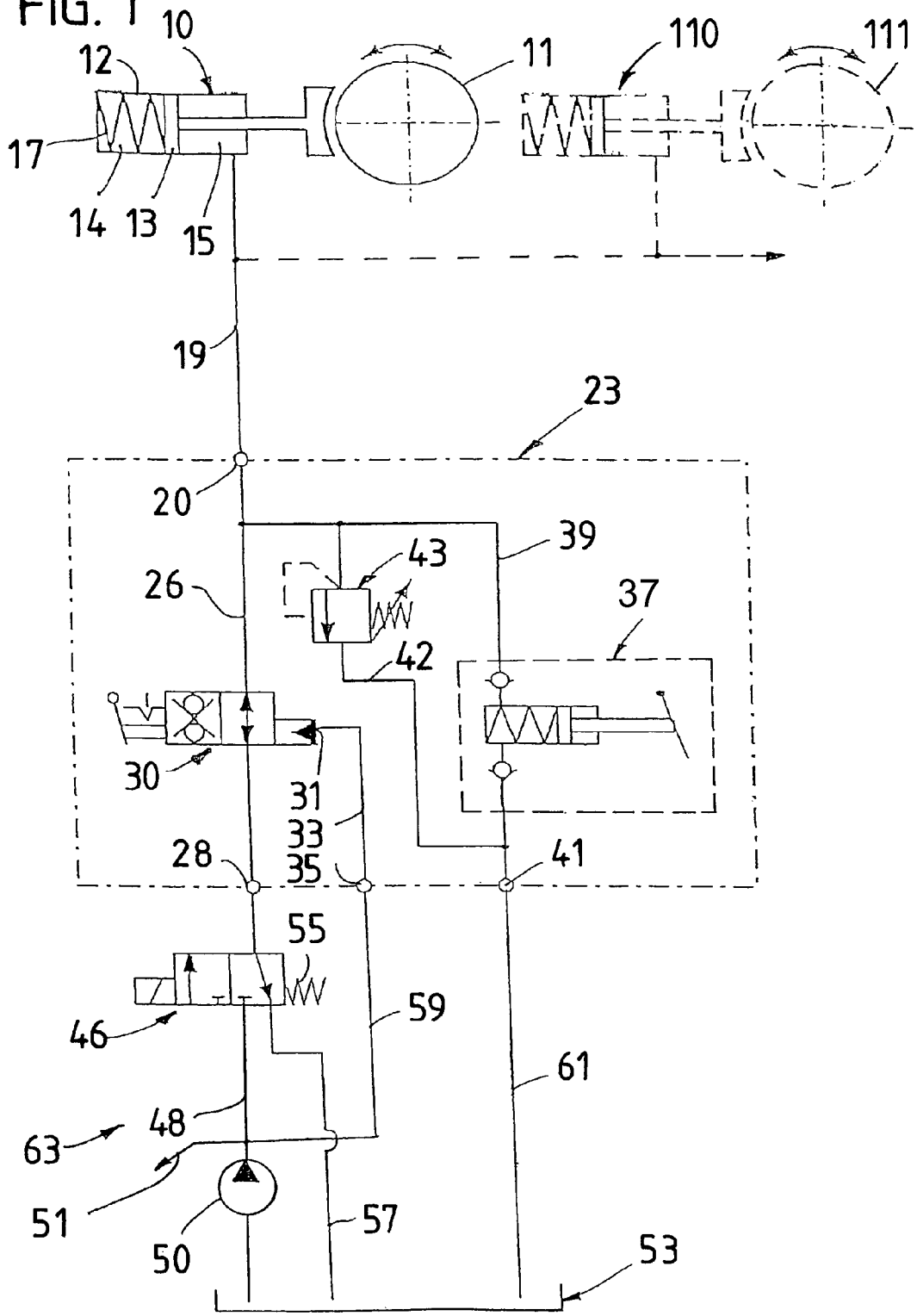

PROCESS FOR RELEASE OF AT LEAST ONE PRESSURE MEDIUM OPERATED SPRING ACCUMULATOR BRAKE AND AN APPARATUS AND HYDRAULIC CIRCUIT FOR CARRYING OUT THE PROCESS

CROSS REFERENCE TO RELATED APPLICATION

This application is a continuation of PCT patent application No. PCT/EP2006/063937, filed on Jul. 6, 2006, which claims the priority of European patent application No. 05106281.8, filed on Jul. 8, 2005. All prior applications are herein incorporated by reference in their entirety.

The invention relates to a process for release of at least one Spring Accumulator Brake (referred to as SABR subsequently in the text), which is operated by a pressure medium, wherein at least one brake is connected to a Brake Release Pressure Supply Circuit (referred to as circuit subsequently in the text) in normal operation, the brake being impacted by a brake release pressure, and wherein, in the service operation, when a failure of the brake release pressure takes place, it is detached from the circuit, to be released through a pressure medium source against the spring force of the spring accumulator. Further, the invention relates to an apparatus as well as a hydraulic circuit for carrying out the process.

SABRs are used, amongst others, for portable machines as auxiliary or emergency or parking brakes, as, for example, in portable construction machinery with a hydrostatic portable drive. In the normal operation, at least one SABR is impacted by a pressure medium for release, particularly by hydraulic fluid. As an example, for parking a machine, the SABR can be connected through a control valve with a feeder tank for the pressure medium so that the pressure medium flows out and the brake locks in place reliably one or more wheels of the machine under the influence of its spring accumulator. The brake must be impacted again afterwards by the pressure medium for release. If a breakdown of the brake release pressure takes place due to, for example, a failure of the drive of the machine, the SABR takes up its brake position automatically. The machine should then be able to be towed away within a short time. For this, it is necessary that the brake gets released. It is a known practice for this purpose to interrupt the connection of the brake with the control valve of the circuit and to impact the brake subsequently with pressure medium from a separate pressure medium source for releasing the brake. The machine then can be towed away for repair.

The interruption (cutting off) of the flow connection between the SABR and the control valve commonly takes place by means of a manually operated cut-off element, which is arranged between the control valve and the SABR in a connecting line. When the cut-off element is closed, the connection between the control valve and the SABR is broken. This ensures that the brake can be impacted by pressure medium in the service operation without the danger of the pressure medium reaching the feeder tank through the control valve. After the machine has been towed away, the cut-off element must be restored so that the connection between the SABR and the control valve is again revived, as otherwise, controlling the SABR through the control valve for parking, for example, is not possible. During normal working of the machine, it is not strictly necessary to make sure whether the control valve and, with it, also the parking brake, has been de-linked from the cut-off element since the machine is hydrostatically braked, for example, when the drive motor is running and hence actuation of the parking brake is not necessary. If the flow connection between the SABR and the control valve is not revived after the towing away is over, it can cause major accidents as the parking brake remains de-energised permanently. For example, a situation can arise when the repaired machine is parked on a slope. So long as the service brake is not active, the machine can be set in motion in an uncontrolled and unstoppable manner due to lack of effective parking brake.

The objective of the present invention is to develop a process of the type, as mentioned at the outset, in such a way that the danger of an accident, taking place in case of a breakdown of the brake release pressure gets minimised.

Through the invention of a process of the generic type, this objective is fulfilled in such a way that at least one SABR automatically gets re-connected with the circuit once the supply of the brake release pressure is restored.

When the machine is repaired after a failure of the brake release pressure, a brake release pressure builds up again in the circuit. As per the invented process, this has an effect that at least one SABR gets re-connected with the circuit automatically. As per the invented process, this results into an automatic resetting of the brake equipment to its original operating state, which was available before the brake release pressure failed. It is not necessary to put back the brake equipment to its original operating state manually. The operational safety can thus be clearly enhanced and serious accidents can be prevented from happening. In case of failure of the brake release pressure, the connection between at least one SABR and the control valve of the circuit can commonly get interrupted so that the brake can be released through a separate pressure medium source against the spring force of the accumulator spring. After repair, when the brake release pressure sets in again, the connection between the brake and the control valve of the circuit is re-established automatically so that the brake becomes available to the machine again for its locking.

It is of advantage when at least one brake is connected to the circuit through a switch organ, wherein the switch organ has one first setting position, in which at least one brake is connected with the circuit and one second setting position, in which at least one brake is detached from the circuit; in service operation, the switch organ passes over to the second setting position and depending on the pressure, prevailing in the circuit, moves back automatically to the first setting position.

It can be planned here that the switch organ is moved over to the second setting position manually in the service operation. In the situation of a failure of the brake release pressure, the connection between at least one brake and the control valve of the circuit can thus be interrupted manually through the switch organ so that the brake can be released afterwards through a separate pressure medium source against the spring force of the accumulator spring. When the brake release pressure is provided again, the switch organ moves back automatically to its first setting position and consequently, at least one brake gets re-connected with the control valve of the circuit.

A hydraulically restorable displacement valve is preferably used as switch organ. This has the advantage that a control entry of the switch organ can be impacted directly by the brake release pressure of the circuit for restoration of the switch organ to its first setting position. The risk, that the switch organ moves over to its second setting position either by mistake or through sabotage even when the brake release pressure is available in the circuit, is clearly minimised because a manual operation of the switch organ then must take place against the effect of the brake release pressure, which lies at the control entry of the switch organ and the switch organ is held against the effect of the brake release pressure.

The invention also relates to an apparatus for releasing at least one SABR, which is operated by a pressure medium, having a switch organ, through which at least one brake is connected to a circuit to be impacted by the brake release pressure, the switch organ having a first setting position, in which at least one brake is connected with the circuit and it having a second setting position, in which at least one brake is detached from the circuit, particularly for carrying out the process, which has been stated earlier.

To develop such an apparatus in a manner, in which the risk of an accident taking place on account of failure of the brake release pressure is reduced, it is proposed in the invention that the switch organ, depending on the pressure prevailing in the circuit, moves back automatically from the second setting position to the first setting position.

As already mentioned, the automatic restoration of the switch organ has the consequence that when the brake release pressure is provided anew, at least one SABR gets re-connected automatically with the circuit without it being necessary to operate the switch organ manually.

It can be scheduled that the switch organ passes over from its first setting position to its second setting position by means of an auxiliary device. It is, however, advantageous to transfer the switch organ manually from its first setting position to its second setting position because then the handling of the apparatus for releasing the SABR becomes simpler. It is of advantage when the switch organ is restored hydraulically from its second setting position to the first setting position. In such an arrangement, the restoration of the switch organ takes place directly through the pressure, prevailing in the circuit; an additional pressure transducer, through which, for example, the switch organ can be electrically actuated, is not necessary. In a particularly cost effective embodiment of the apparatus as per the invention, the switch organ is designed as a displacement valve, which can be manually operated and hydraulically restored, particularly in the shape of a 2/2 check valve with hydraulic resetting. In its first setting position, the check valve materialises the connection between at least one SABR and the circuit, contrary to which, the said connection is interrupted in the second setting position. It can be manually carried over from its first to its second setting position by means of, for example, a tappet or a slide and it moves back automatically from its second setting position to the first setting position, depending on the pressure prevailing in the circuit.

In a preferred embodiment, the apparatus has a pressure inlet port for connection with the control valve of the circuit and a pressure outlet port for connection with at least one SABR, wherein the pressure inlet is connected with the pressure outlet via a connection channel and the switch organ is connected in the connection channel; further, the apparatus has a control inlet port, which is connected with the control entry of the switch organ and is impacted by the brake release pressure. In the normal operation, for releasing the brake, pressure medium can be supplied from the circuit to at least one brake through the connection channel. The switch organ here takes up its first setting position and the pressure inlet, as well as the control inlet ports are impacted by the brake release pressure, which is supplied by the circuit. If a failure of the brake release pressure takes place due to any disturbance, the switch organ can be passed over to its second setting position and at least one SABR can be released through an external source of pressure medium. When the brake release pressure is provided again, it also becomes available at the control inlet port and the switch organ moves back automatically to its first setting position.

The apparatus preferably includes a supply channel; in case of a service operation, at least one brake can be connected through this supply channel with the pressure medium source. An apparatus of such design as per the invention not only displays the function of providing a connection between at least one SABR and the circuit, depending on the pressure prevailing in the circuit, but it also takes over the additional function of supplying pressure medium for releasing at least one brake in case of failure of the brake release pressure.

It is of advantage when the supply channel joins the connection channel in the area between the switch organ and the pressure outlet port. The advantage is that if there is also a failure of brake release pressure of at least one brake, a pressure medium for release can be supplied through the pressure outlet port of the apparatus. A separate exit for the pressure medium, which is provided in case of a failure of the brake release pressure, can then be done away with.

The pressure medium source, which supplies the necessary pressure medium for ventilating at least one brake in case of failure of the brake release pressure, can be, for example, an external hydraulic accumulator or an external pressure medium pump. It is, however, particularly advantageous when the apparatus as per the invention includes the pressure medium source because then the elaborate circuit arrangement for the total brake equipment can be minimised. The pressure medium source should preferably be operated manually, as in that case, the additional driving elements for releasing the brake in service operation can be done away with.

In a preferred embodiment, the apparatus includes a tank connector for getting connected with a pressure medium feeder tank, wherein the supply channel joins with the tank connector and the pressure medium source is put into operation in the shape of an auxiliary pump in the supply channel. This makes it possible to design the apparatus as per the invention as a compact assembly unit. To avoid the possibility that the pressure medium is subjected to an excessively high pressure through the auxiliary pump, it is of advantage when a pressure-limiting member is put into operation in parallel with the auxiliary pump, specially a pressure-limiting valve.

The invention further relates to a hydraulic circuit for releasing at least one SABR, which is operated by a pressure medium, specially for carrying out the above mentioned process, having a feeder tank for hydraulic fluid, which can be supplied to at least one SABR through at least one pump, at least one control valve and a switch organ, wherein the control valve, in a first valve position, connects at least one brake with at least one pump and, in a second valve position, connects the brake with the feeder tank after bypassing the pump, and having a source for the pressurized hydraulic fluid, which can be supplied to at least one brake in case of a failure of the pump, wherein the switch organ can be transferred from an open position to a close position when the pump breaks down, said switch organ blocking the connection between at least one brake and the control valve.

To develop the hydraulic circuit in such a way, that the risk of an accident reduces after a failure of the brake release pressure, it is proposed in the invention that the switch organ is restored automatically from its close position to its open position depending on the pressure of the hydraulic fluid, which is delivered by the pump after it has been put back in use. During normal operation of the pump, at least one SABR can be controlled by the control valve. For releasing the brake, it takes up its first valve position so that the hydraulic fluid, which is pressurized by the pump, can be delivered to the brake. If a connected wheel is locked in place by the brake, it is merely required here to transfer the control valve to its second setting position, in which the brake is connected with the feeder tank of the hydraulic fluid and therefore, under the influence of the spring force of the spring accumulator, the hydraulic fluid can flow out from the brake in to the feeder tank. If the brake is to be released again, the control valve is again passed over to its first setting position.

If the pump breaks down due to any disturbance, a proper release of at least one SABR is no longer possible. In such a situation, the switch organ can pass over from its open position to its close position and at least one brake can be subsequently impacted by the pressurized hydraulic fluid from the pressure source, whereby it is ensured through the close position of the switch organ that the pressurized hydraulic fluid can not reach the feeder tank via the control valve. When the pump becomes functional again, the brake release pressure builds up again in the zone before the control valve; as per the invention, it so happens consequently that the switch organ again takes up its open position automatically, so that controlling at least one SABR through the control valve becomes possible.

It is convenient when the control valve is configured as a displacement valve, which is electrically operated and can be restored by a spring, particularly as 3/2-displacement valve. Through electrical operation and against the influence of a restoring force, the control valve can be put in a position in which the brake remains in flow connection with at least one pump and therefore can be released. If the power supply of the electrical displacement valve is interrupted, it crosses over automatically to its second valve position on account of the spring force acting on it, with the brake staying in contact with the feeder tank and getting disconnected from the pump in this position.

In a preferred embodiment of the hydraulic circuit, the switch organ is configured as manually operable and hydraulically restorable displacement valve. As already explained, it has the advantage that, in case of a failure of the brake release pressure, the switch organ can be manually operated and when the brake release pressure is provided again, it is pushed back directly to its open position by the same. The source of the pressurized hydraulic fluid is preferably configured as hand pump. In a service operation, the brake can be manually released by means of the hand pump.

For more detailed explanation, a description of a preferred embodiment of the invention, accompanied by the drawings, is given below. It shows in:

FIG. 1: A block diagram of a hydraulic circuit with one or more SABR, a brake release pressure supply circuit (circuit) and an apparatus, which is connected in between, for releasing the brakes.

Figure 2:
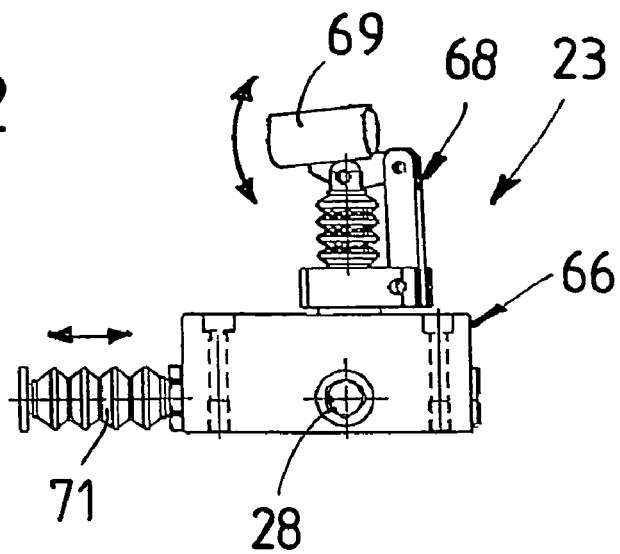

FIG. 2: A schematic side view of the apparatus for releasing the brakes from FIG. 1.

Figure 3:
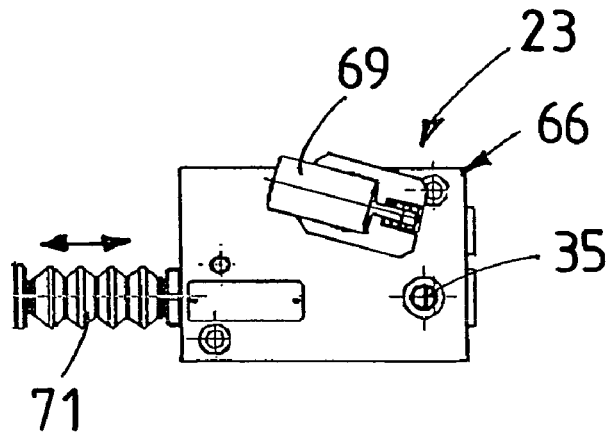

FIG. 3: A schematic top view of the apparatus for releasing the brakes from FIG. 1.

Figure 4:
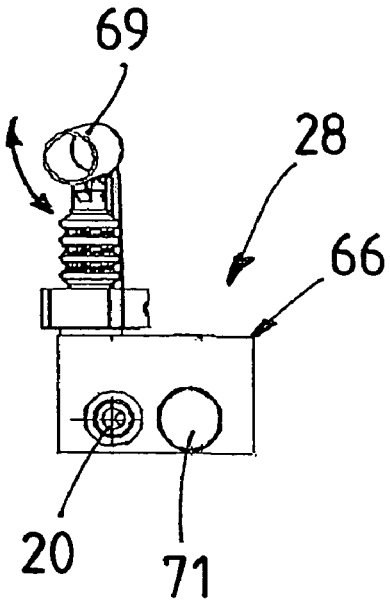

FIG. 4: A schematic back view of the apparatus for releasing the brakes from FIG. 1.

A hydraulic circuit as per the invention is schematically shown in FIG. 1, having a SABR 10, which works together with a wheel 11, which is commonly (and hence is not shown in the drawing) set in rotation by a hydrostatic portable drive. It can be, for example, the drive wheel of a portable construction machinery. Alternatively, the SABR 10 can also act on a drive shaft, an axle or other movable elements. Further, it can be planned that the SABR 10 acts on several wheels, drive shafts etc. The hydraulic circuit can also have more SABRs, as is illustrated through the example of a SABR 110 in dotted line in FIG. 1. All the SABRs 10 and 110 are connected with each other and work in identical manner.

The SABR 10, as also the SABR 110, has a cylinder 12, in which a movable piston 13 is placed. The piston 13 divides the inner space of the cylinder 12 in to a back cylinder space 14 and a forward cylinder space 15. In the back cylinder space 14, a spring accumulator in the form of a compression spring 17 is placed, which impacts the piston 13 with a spring force in the direction of the forward cylinder space 15. Via a supply line 19, the forward cylinder space 15 stays in flow connection with a pressure outlet port 20 of the apparatus, which is denoted in total by the reference number 23, for releasing the brake 10. The apparatus 23 has a connection channel 26, through which the pressure outlet port 20 remains in flow connection with a pressure inlet port 28, and a switch organ, in the form of a check valve 30, which can be operated manually and restored hydraulically, is connected in the connection channel 26. The check valve 30 has a control entry 31, which stays in flow connection with a control inlet port 35 of the apparatus 23 via a control channel 33.

The apparatus 23 further includes a source for pressurized hydraulic fluid in the shape of a hand pump 37, which stays in flow connection with the connection channel 26 via a delivery channel 39, wherein the delivery channel 39 joins with the connection channel 26 in the zone between the check valve 30 and the pressure outlet port 20. The delivery channel 39 extends up to a tank connector 41 of the apparatus 23. A bypass channel 42 runs parallel to the hand pump 37 and a pressure limiting member in the form of a pressure limiting valve 43 is connected in this channel. The hydraulic circuit, as illustrated in FIG. 1, further shows a control valve 46, which is connected to an inflow line 48. The inflow line 48 connects a pump 50 with the pressure inlet port 28 of the apparatus 23 and extends at the suction side of the pump 50 up to a feeder tank 53 for the hydraulic fluid.

The control valve 46 is constructed as electrically operated 3/2-displacement valve, which can be restored by a spring 55; in a first valve position, this valve connects the SABR 10 as well as the SABR 110 with the pump 50 and in a second valve position, as illustrated in FIG. 1, it connects the SABR 10, 110 with the feeder tank 53 via a return line 57. The pump 50 remains in flow connection with a control inlet port 35 via a branch line 59, wherein the branch line 59 bypasses the control valve 46 and thus provides a direct connection between the control inlet port 35 of the apparatus 23 and the pump 50. On the pressure side of the pump 50, via a connection line 51, the known actual consumer (and hence not shown in the drawing) is connected, which can be, for example, a hydraulic pre-control arrangement for the construction machinery, a steering circle and/or a pressure protection. The tank connector 41 of the apparatus 23 is connected with the feeder tank 53 via a tank line 61.

In the normal operation, the SABR 10 and 110 can be controlled by the control valve 46 in such a manner that the control valve 46 is passed over electrically to its second valve position to lock in position at least one wheel 11 and at least one wheel 111, upon which the SABR 110 works; in this valve position, the SABRs 10 and 110 are connected with the feeder tank 53 via the supply line 19, the connection channel 26, the control valve 46 and the return line 57 so that the hydraulic fluid can flow from the forward cylinder space 15 to the feeder tank 53 and the SABRs 10 and 110 lock the wheels 11 and 111 under the influence of their compression springs 17. In normal operation, if the SABRs 10, 110 are to be released, the control valve 46 is passed over to its first valve position for this purpose, where it sets free the flow connection between the pump 50 and the SABRs 10, 110 so that pressurized hydraulic fluid can be supplied to the forward cylinder spaces 15 and consequently, the SABRs 10, 110 can be released against the working of their compression springs 17.

If due to any disturbance the pump 50 breaks down, the pressure falls in the forward cylinder space 15 and the SABRs 10, 110 cross over independently to their brake positions and lock the wheels 11, 111. If the SABRs 10, 110 are to be released in service operation now, the connection between the SABRs 10, 110 and the control valve 46 can be interrupted for this purpose through the check valve 30, wherein the check valve 30 is manually transferred to its second setting position. By means of the hand pump 37, hydraulic fluid from the feeder tank 53 can then be delivered to forward cylinder space 15 to ventilate the SABRs 10, 110. As the hydraulic circuit in FIG. 1 illustrates, this makes it possible to tow away a portable machine, for example, in case of failure of the drive system. When the drive system is repaired afterwards, hydraulic fluid from feeder tank 53 can again be pressurized by means of the pump 50. This results into the control entry 31 of the check valve 30 being impacted by pressure via the branch line 59 and the control channel 33, whereupon the check valve 30 crosses over automatically again from its second setting position to its first setting position. Consequently, through supplying the brake release pressure to the brake release pressure supply circuit (circuit), which is made up of the pump and the control valve 46, an automatic restoration of the check valve 30 can be guaranteed. A manual restoration of the check valve 30 is not required. With this, after the pump 50 has been repaired, control valve 46 again becomes ready for service for steering the SABRs 10, 110 automatically.

In the FIGS. 2, 3 and 4, the apparatus 23 for releasing the SABR 10,110 is illustrated in a side view, a top view and a back view. The apparatus is constructed as control block and has a cuboid shaped casing 66, which accommodates the hand pump 37 and the check valve 30. At the top side of the casing 66, a compound lever 68 for operating the hand pump 37 is placed; the compound lever 68 has a sleeve 69, in which a swivelling lever (not shown in the drawing) can be put in for operating the hand pump 37. At the side of the casing 66, a slider or ram 71 is held in such a way that it can be moved along its length. The check valve 30 can be passed over manually from its first to its second setting position by means of the ram 71. The ram 71 can be held in the second setting position and is moved back automatically to its original position when the control entry 31 is impacted by the brake release pressure, which becomes available at the circuit 63 when the pump 50 works properly. The control entry port 35 is placed at the top side of the casing 66; on one of its longitudinal sides, the casing 66 has the pressure inlet port 28. The pressure outlet port 20 is positioned sideways by the side of the ram 71. The tank connection 41 of the apparatus 23 is situated on the opposite side of the pressure inlet port 28 of the casing 66 and hence is not shown in the FIGS. 2, 3 and 4.

The apparatus 23 for releasing the SABR 10, 110 is configured as a compact assembly unit, which provides for release of the SABR 10, 110 in a simple manner in case of a disturbance, whereby it is ensured that the connection between the SABR 10, 110 and the control valve 46 is established automatically when the brake release pressure is available again and when the check valve 30 is restored to its first setting position, depending upon the pressure, which is available in the brake release pressure supply circuit 63.

What is claimed is:

1. A process for releasing at least one spring accumulator brake, which is operated by a pressure medium,
   wherein in normal operation, said at least one brake is connected through a switch organ to a control valve and subsequently to a pump of a brake-release-pressure-supply-circuit for release of the brake by a brake release pressure, and
   wherein in service operation when the brake release pressure fails, said at least one brake is separated from the circuit by the operation of said switch organ and is released through an auxiliary pressure medium source, characterized in that said switch organ is further connected to said pump by a branch line that bypasses said control valve of the circuit and provides a direct connection between said pump and said switch organ, the process comprising:
   wherein when the brake release pressure is provided by said pump after a service operation, a pressurized hydraulic fluid is delivered directly from said pump to said switch organ through said branch line to provide automatic restoration of said switch organ, independent of said control valve of said circuit, thereby resulting in automatic reconnection of said at least one brake to said circuit.

2. The process according to claim 1, characterized in that the switch organ displays one first setting position in which at least one brake is connected with the circuit, and one second setting position in which at least one brake is separated from the circuit, and wherein, in service operation, the switch organ passes over to the second setting position and, depending on the pressure of said pressurized hydraulic fluid into the switch organ, moves back automatically again to the first setting position.

3. The process according to claim 2, characterized in that in the service operation the switch organ is carried over manually to the second setting position.

4. The process according to claim 2, characterized in that a hydraulically restorable displacement valve is used as the switch organ.

5. An apparatus of a brake circuit for releasing at least one spring accumulator brake, comprising:
   a switch organ having a first setting position and a second setting position, wherein during normal operation said switch organ is in said first setting position and connects said at least one spring accumulator brake to a control valve and subsequently to a pump connected to a pressure medium-feeder tank of said circuit for release of the brake by a brake release pressure; and
   an auxiliary pressure medium source for release of said at least one spring accumulator brake by an auxiliary brake release pressure during a service operation when said switch organ is in said second setting position, an outlet of the auxiliary pressure medium source being connected to a connection channel connecting said switch organ and a pressure outlet port at one end of said apparatus that is in fluid connection with said at least one spring accumulator brake, and an inlet of the auxiliary pressure medium source being connected with said pressure medium-feeder tank;
   wherein said switch organ is further connected to said pump of said circuit by a branch line that bypasses said control valve and provides a direct connection between said pump and said switch organ to provide automatic restoration of said switch organ from said second setting position to said first setting position when said brake release pressure is provided by said pump after a service operation, independent of said control valve of said circuit, thereby resulting in automatic reconnection of said at least one spring accumulator brake to said circuit.

6. The apparatus according to claim 5, characterized in that the switch organ can be carried over manually from the first setting position to the second setting position.

7. The apparatus according to claim 5, characterized in that the switch organ can be restored hydraulically from the second setting position to the first setting position.

8. The apparatus according to claim 5, characterized in that the switch organ is a displacement valve, which can be manually operated and hydraulically restored.

9. The apparatus according to claim 5, characterized in that the apparatus has a pressure inlet port for connection to the control valve of the circuit and the pressure outlet port for connection to said at least one brake, wherein the pressure inlet port is connected with the pressure outlet port via the connection channel and the switch organ is connected in the connection channel and that the apparatus has a control inlet port, which is connected with a control entry of the switch organ and which can be connected to the circuit.

10. The apparatus according to claim 9, characterized in that the apparatus has a delivery channel, wherein, in case of a service operation, said at least one brake can be connected with the auxiliary pressure medium source via the delivery channel.

11. The apparatus according to claim 10, characterized in that the delivery channel joins with the connection channel in the zone between the switch organ and the pressure outlet port.

12. The apparatus according to claim 9, characterized in that said control entry of the switch organ is connected to said pump through said branch line.

13. The apparatus according to claim 5, characterized in that the auxiliary pressure medium source can be operated manually.

14. The apparatus according to claim 5, characterized in that the apparatus has a tank connector for connection to said pressure medium-feeder tank, wherein the delivery channel is connected to the tank connector, and the auxiliary pressure medium source, in the shape of an auxiliary pump, is connected to the delivery channel.

15. The apparatus according to claim 14, characterized in that a pressure limiting part is connected parallel to the auxiliary pump.

16. A hydraulic circuit for releasing at least one spring accumulator brake, comprising:
a feeder tank for holding hydraulic fluid that is to be delivered to said at least one spring accumulator brake;
a pump for generating a brake release pressure for release of said at least one brake; and
a control valve connecting said at least one brake with said pump while in a first valve position, and connecting said at least one brake with said feeder tank by circumventing said pump while in a second valve position;
said hydraulic circuit further comprising an apparatus for releasing said at least one spring accumulator brake, comprising:
an auxiliary pressure medium source for generating an auxiliary brake release pressure for release of said at least one brake; and
a switch organ having an open position and a closed position;
wherein said feeder tank is further connected to said auxiliary pressure medium source for delivering said hydraulic fluid to said at least one brake in case of failure of said pump;
wherein said switch organ can be passed over from said open position to said closed position in case of failure of said pump, and while in said closed position said switch organ blocks connection between said at least one brake and said control valve;
wherein said switch organ is further connected to said pump by a branch line that bypasses said control valve and provides a direct connection between said pump and said switch organ; and
wherein said pressurized hydraulic fluid can be delivered directly from said pump through said branch line to said switch organ to provide automatic restoration of said switch organ from said closed position to said open position when said brake release pressure is provided by said pump after a service operation, independent of said control valve of said circuit, thereby resulting in automatic reconnection of said at least one brake to said circuit.

17. The hydraulic circuit according to claim 16, characterized in that the control valve is configured as displacement valve, which is electrically operated and can be restored by a spring.

18. The hydraulic circuit according to claim 16, characterized in that the switch organ is configured as a displacement valve, which is manually operated and can be restored hydraulically.

19. The hydraulic circuit according to claim 16, characterized in that the auxiliary pressure medium source is configured as hand pump.

* * * * *